United States Patent [19]

Nakada

[11] Patent Number: 5,638,526
[45] Date of Patent: Jun. 10, 1997

[54] APPARATUS FOR OPERAND DATA BYPASSING HAVING PREVIOUS OPERAND STORAGE REGISTER CONNECTED BETWEEN ARITHMETIC INPUT SELECTOR AND ARITHMETIC UNIT

[75] Inventor: Tatsumi Nakada, Kawasaki, Japan

[73] Assignee: Fujitsu Limited, Kanagawa, Japan

[21] Appl. No.: 364,512

[22] Filed: Dec. 27, 1994

Related U.S. Application Data

[63] Continuation of Ser. No. 978,613, Nov. 19, 1992, abandoned.

[30] Foreign Application Priority Data

Nov. 20, 1991 [JP] Japan .................. 3-304895

[51] Int. Cl.⁶ ........................................ G06F 9/34
[52] U.S. Cl. ........................................ 395/394
[58] Field of Search .......................... 395/375, 775, 395/394

[56] References Cited

U.S. PATENT DOCUMENTS

| 4,777,594 | 10/1988 | Jones et al. ............... | 395/375 |
| 5,043,868 | 8/1991 | Kitamura et al. ............ | 395/775 |
| 5,123,108 | 6/1992 | Olson et al. ............... | 395/800 |
| 5,148,529 | 9/1992 | Ueda et al. ................ | 395/375 |
| 5,222,240 | 6/1993 | Patel ...................... | 395/775 |
| 5,404,552 | 4/1995 | Ikenaga .................... | 395/800 |

FOREIGN PATENT DOCUMENTS

| 0411747 | 5/1990 | European Pat. Off. . |
| 0427245 | 11/1990 | European Pat. Off. . |
| 2239535 | 7/1991 | United Kingdom . |

OTHER PUBLICATIONS

IBM Technical Disclosure Bulletin, vol. 27, No. 8, Jan. 1985, New York, US, p. 4646, Olnowich and Vanding "Means for Executing Register to Register Instructions in a Computer with a Single Port Local Store".

*Primary Examiner*—Richard L. Ellis
*Attorney, Agent, or Firm*—Nikaido Marmelstein Murray & Oram LLP

[57] ABSTRACT

A register read control method for use with an information processing apparatus for executing a plurality of instructions in parallel during pipeline processing. The apparatus includes a register file, a register designation selector, a cache register, a selector, an arithmetic circuit, a register cache pass and a comparator. When the comparator detects a coincidence between the data in the cache register for the current instruction and the operand in the next instruction, the comparator causes the selector to select the register cache pass as input thereto and to move the contents of the cache register back directly to the cache register via the register cache pass.

7 Claims, 7 Drawing Sheets

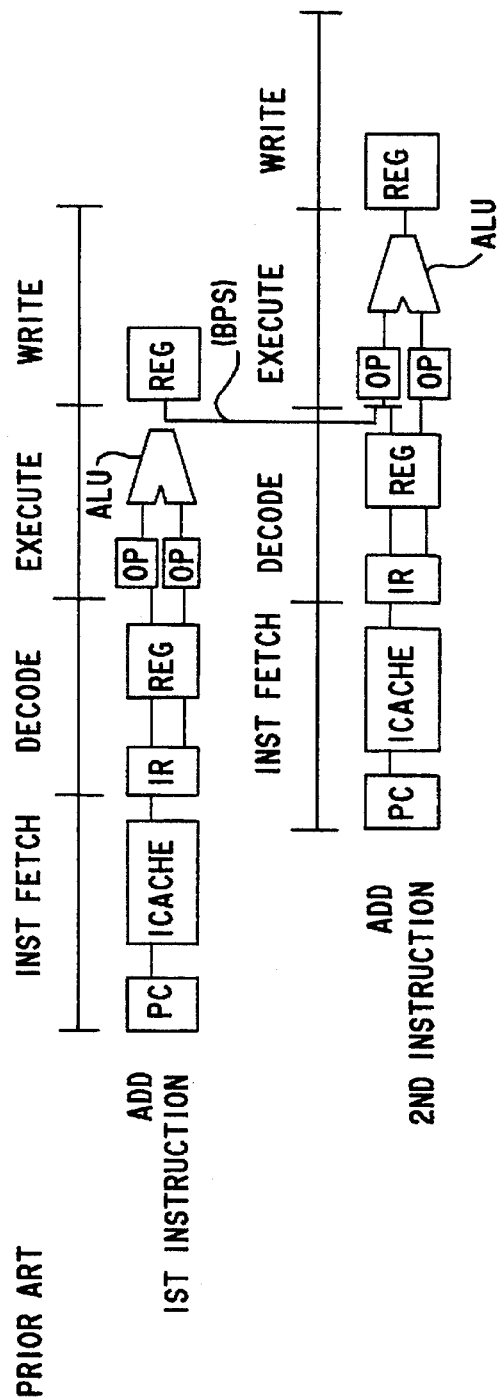
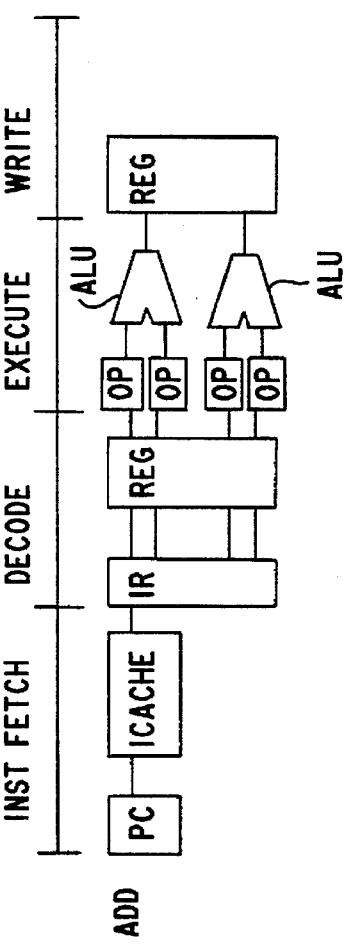
FIG.2 PRIOR ART
FIG.3 PRIOR ART

FIG.9
WORKING OF SEL 11

| CONDITIONS | INPUT | PASS |
|---|---|---|
| R11 = ODR1 | ALU1 | BPS 1 |
| R11 = ODR2 | ALU2 | BPS 2 |
| R11 = OR11 | OP11 | RCPS 1 |
| OTHERS | PORT 1 | BDP 1 |

FIG.10
WORKING OF SEL 12

| CONDITIONS | INPUT | PASS |
|---|---|---|
| R12 = ODR1 | ALU1 | BPS 1 |
| R12 = ODR2 | ALU2 | BPS 2 |
| R12 = OR11 | OP11 | RCPS 1 |
| OTHERS | PORT 1 | BDP 1 |

FIG.11
WORKING OF SEL 21

| CONDITIONS | INPUT | PASS |
|---|---|---|
| R22 = ODR1 | ALU1 | BPS 1 |
| R22 = ODR2 | ALU2 | BPS 2 |
| R22 = OR11 | OP11 | RCPS 1 |
| R22 = OR21 | OP21 | RCPS 2 |
| OTHERS | PORT 2 | BDP 2 |

FIG.12
WORKING OF SEL 22

| CONDITIONS | INPUT | PASS |
|---|---|---|
| R22 = ODR1 | ALU1 | BPS 1 |
| R22 = ODR2 | ALU2 | BPS 2 |
| R22 = OR11 | OP11 | RCPS 1 |
| R22 = OR21 | OP21 | RCPS 2 |
| OTHERS | PORT 2 | BDP 2 |

WORKING OF ISEL1

| CONDITIONS | OUTPUTS |
|---|---|
| R11 = ODR1 OR R11 = ODR2 OR R11 = OR11 | R12 |
| OTHERS | R11 |

WORKING OF ISEL2

| CONDITIONS | OUTPUTS |
|---|---|
| R21 = ODR1 OR R21 = ODR2 OR R21 = OR11 OR R21 = OR21 | R22 |
| OTHERS | R21 |

…

APPARATUS FOR OPERAND DATA BYPASSING HAVING PREVIOUS OPERAND STORAGE REGISTER CONNECTED BETWEEN ARITHMETIC INPUT SELECTOR AND ARITHMETIC UNIT

This application is a continuation of application Ser. No. 07/978,613 filed Nov. 19, 1992 now abandoned.

FIELD OF THE INVENTION

The present invention relates to a method for executing a plurality of instructions per execution cycle effectively and at high speed using a minimum amount of hardware.

BACKGROUND OF THE INVENTION

Recently developed methods for speeding up the processing of information processing apparatuses include the so-called superscalar method, VLIW (very-long-instruction-word) method and super-pipeline method. These methods are capable of executing a plurality of instructions in a single cycle. What follows is a description of the bypass function (using an arithmetic circuit output bypass, or BPS) characteristic of the typical prior art pipeline processing. For the description, reference is made to FIGS. 2 and 3.

As shown in FIGS. 2 and 3, the stages of pipeline processing comprise an instruction fetch stage (Inst Fetch) for fetching instruction cache data (ICACHE) in accordance with a program counter (PC), a decode stage (Decode) for decoding an instruction, an execute stage for moving the contents of a register file (REG) into operand registers (OP) for execution by an arithmetic and logic unit (ALU), and a write stage for writing the result of the execution to the register file (REG). The speed of the processing is enhanced by having the handling of each instruction split into a plurality of stages even as a plurality of instructions are being processed in parallel. As depicted in FIG. 2, the result from the arithmetic and logic unit (ALU) is transferred through an arithmetic circuit output bypass (BPS) to the operand registers for the next instruction. That is, the execution result from the preceding instruction is used unmodified by the current instruction, whereby the processing speed is increased.

In the pipeline processing of FIG. 2, raising the number of instructions executing in parallel requires installing more read ports (PT) from the register file (REG), as shown in FIG. 3. (FIG. 3 shows a four-port setup.) The resultant increases the amount of hardware and prolongs delays in the time it takes a selector (SEL) to perform its processing. Consequently, cost of the processing apparatus tend to be high due to its bloated hardware even as the efficiency and speed of the processing are liable to worsen.

Super scalar microprocessor design (Mike Johnson 1991, Prentice Hall) describes how to reduce the number of register file read ports since not all instructions need register read processing for their operand data (for example immediate operand).

A register designator arbitration means is provided. There is a selector which inputs register designators of all instructions and selects only the register designators which indicate an operand that must be read from a register file. Thereby the number of implemented register ports is reduced.

SUMMARY OF THE INVENTION

It is therefore an object of the present invention to provide a method for executing a plurality of instructions efficiently and at high speed with no increase in the number of read ports of the register file, i.e., with a minimum quantity of hardware required.

In carrying out the invention and according to one aspect thereof, there is provided a register read control method for use with an information processing apparatus performing pipeline processing by operating on instructions, part of each of the instructions containing information as operands for selecting register data, the information processing apparatus comprising: register file means for storing the register data; cache register means for temporarily storing the register data output by the register file means; arithmetic circuit means for operating on fetched data; arithmetic input selector means interposingly provided between the register file means and the arithmetic circuit means; register cache pass means for connecting the output of the cache register means to the input of the arithmetic input selector means; and comparator means for detecting a coincidence between the register data held in the cache register means and the register data to be used by the next instruction; the register read control method controlling register read operations in such a manner that if the comparator means detects a coincidence between the register data in the cache register means and the data to be used by the next instruction, the comparator means causes the arithmetic input selector means to select the input signal from the register cache pass means as the output signal from the arithmetic input selector means, wherein the register data held in the cache register means are output to the arithmetic circuit means via the register cache pass means.

In general, a register whose contents are read by an instruction is highly likely to be accessed later by a subsequent instruction. Consider the frame pointer, segment base register and loop variable register (the configuration varies depending on the architecture, compiler and program lineup of the computer). In a software system that generates parameters and local valuables between subprograms in a stack frame, it is highly probable that the frame pointer is accessed at least once every several instructions.

As shown in FIG. 1 (A), the present invention involves establishing a cache register (CR) in an arithmetic circuit 1 (e.g., ALU). If comparing the data in the cache register with the data for use by the next instruction detects a coincidence therebetween, the contents of the cache register are output to the arithmetic circuit 1 (ALU) via a register cache pass (RCPS).

In the setup of FIG. 1 (B), operand registers (OP) are used as cache registers. Although a preceding register number retaining register (OP) is included in the setup.

In operation of the arithmetic circuit 1 (ALU), a comparator circuit (COMP) compares the register number of the current instruction with that of the next instruction (OPRA0). If the comparison indicates that the same register is to be used by the next instruction, the comparator circuit (COMP) causes arithmetic input selector means (SEL) to move the contents of a cache register (CR) via a register cache pass (RCPS) back to the arithmetic input selector means (SEL) and then on to the arithmetic circuit 1 (ALU). That is, if the same register data are to be used by the next instruction, there is no need to read the contents of a register file (REG) again.

Then, the read port of register file (REG) is free, the comparator circuit (COMP) causes register read address selector means (ISEL) to move the value of another register read address (OPRA1) to the register file read port (PT). The output of register file (REG) is used for another operand data.

The cache register arrangement drastically reduces the number of times the contents of the resister file (REG) are read, and reads plural operand data from a register file port, thereby implementing fast and efficient processing with no increase of read ports (PT) of the register file (REG). Cache registers may be either dedicated registers or register capabilities implemented as needed by the operand registers (OP) that retain primarily the operands of the arithmetic circuit 1 (ALU), as shown in FIG. 1.

These and other objects, features and advantages of the invention will become more apparent upon a reading of the following description and appended drawings.

The progress point of this invention is reducing the number of operand datum which must be read from a register file. This invention use previous register designator arbitration means, so that this paper does not describe this mechanism in detail.

BRIEF DESCRIPTION OF THE DRAWINGS

FIGS. 2 and 3 are views describing the typical pipeline processing of the prior art:

FIGS. 9, 10, 11, and 12 are tables depicting the conditions under which the selector means of the apparatus operates in connection with the invention;

DESCRIPTION OF THE PREFERRED EMBODIMENT

Figure 1A:
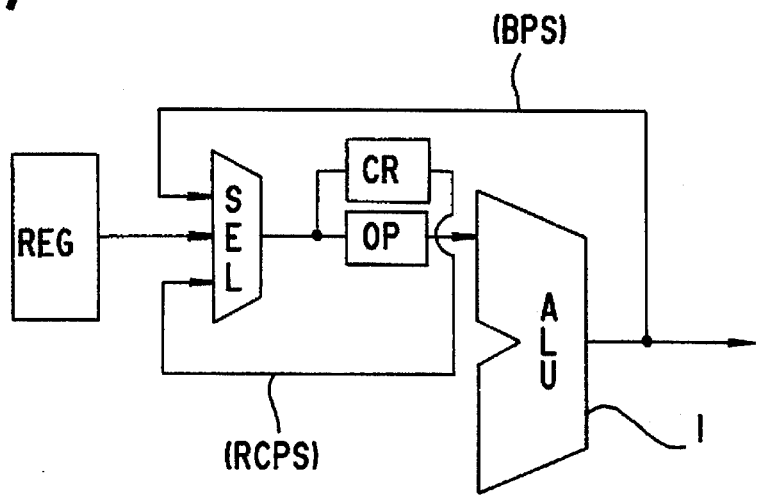
FIGS. 1(A)–1(B) are a set of views illustrating the operating principle of the present invention.
Figure 1B:
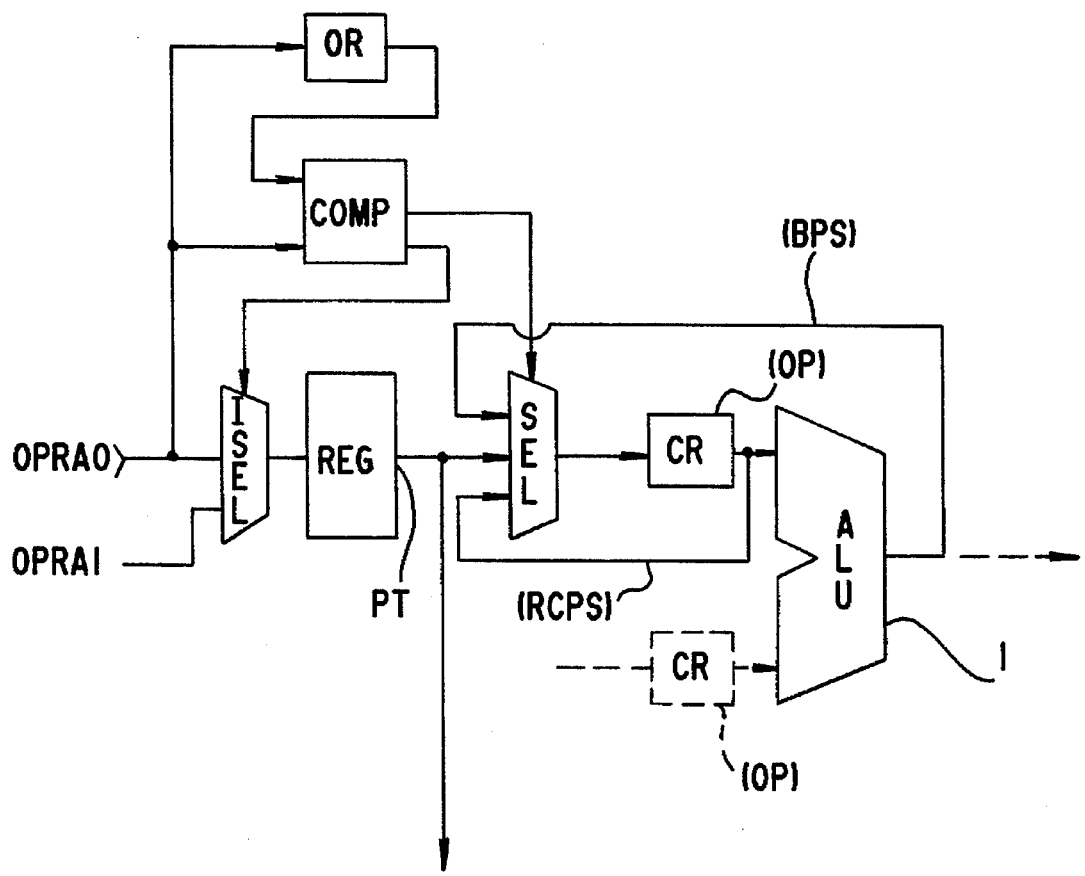
Figure 4:
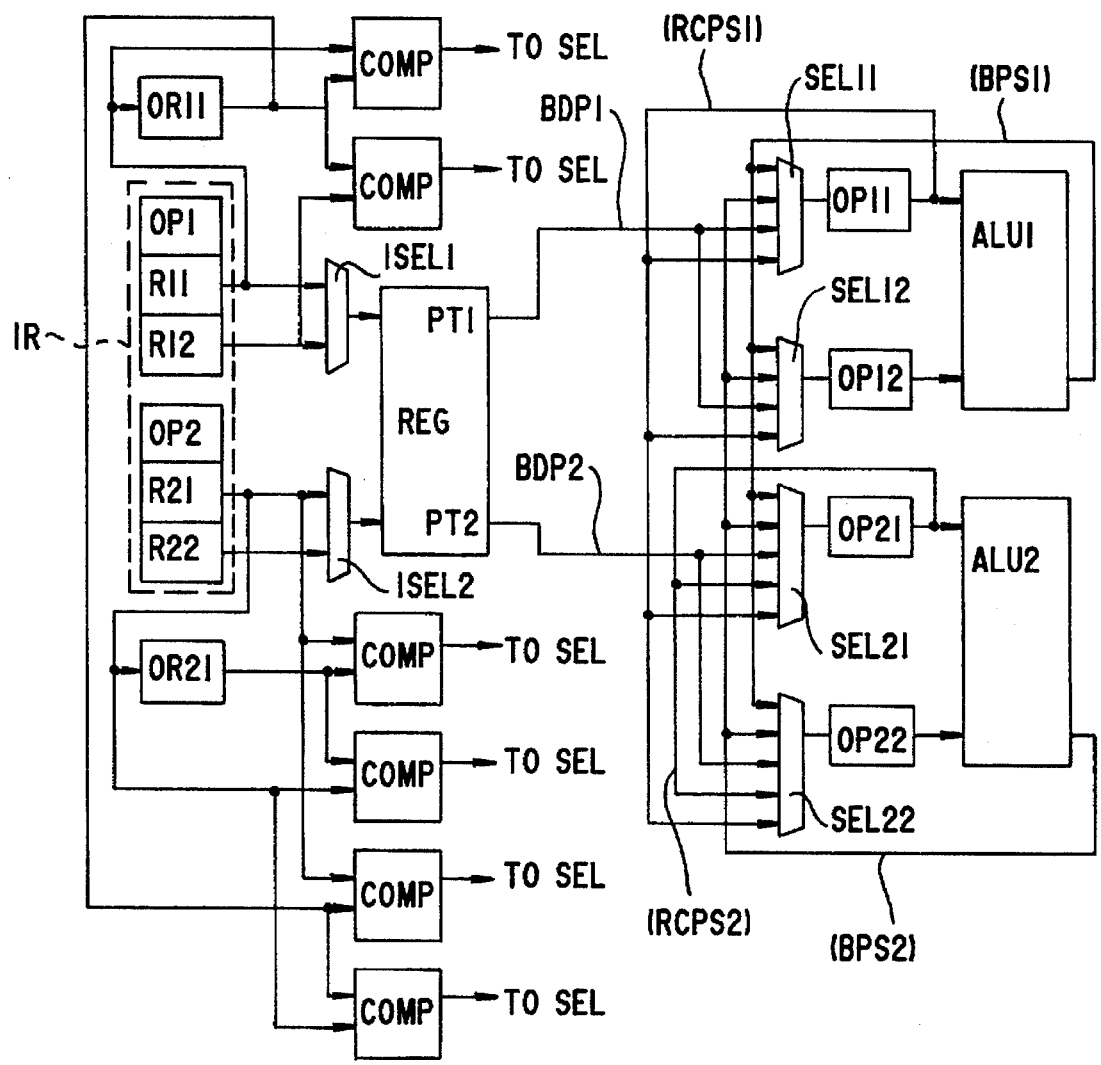
FIG. 4 is a block diagram of an information processing apparatus to which the invention is applied.

FIG. 4 is a block diagram of a typical information processing apparatus to which the invention is applied. This circuit configuration utilizes a dual port (PT1, PT2) register system.

In FIG. 4, an instruction register (IR) is divided into a first instruction part (OP1) and a second instruction part (OP2). Each of the instruction parts (OP1, OP2) is divided into a first register part (R11, R21) and a second register part (R12, R22).

The output of the respective register parts reaches a register file (REG) after passing through instruction register output selectors (ISEL1, ISEL2). Inside or outside the instruction register, preceding register number retaining parts (OR11, OR21) are provided to accommodate the register numbers that are read from operand registers (OP11, OP21), to be described later.

The values of the operand register number retaining parts (OR11, OR21) and those of the register parts are output to a comparator circuit (COMP) for comparison therebetween. Based on the result of the comparison, the comparator circuit controls arithmetic input selectors (SEL). How the selectors are controlled will be described later in detail.

The register file (REG) is a memory circuit constituted by such registers as general registers and floating-point registers. The register file has a pair of output ports (PT1, PT2) provided for two arithmetic circuits (ALU1, ALU2), respectively.

Upstream of the arithmetic circuits (ALU1, ALU2) are two pairs of operand registers (OP11, OP12; OP21, OP22). Upstream of these operand registers are the arithmetic input selectors (SEL: SEL11–SEL22). These selectors accept the output from the arithmetic circuits (ALU), the output from the register file (REG), and the contents of register cache passes (RCPS1, RCPS2) from the operand registers (OP) acting as cache registers (CR). Given these inputs, the selectors SEL11 and SEL21 supply the operand registers (OP) selectively with the output from the arithmetic circuits (ALU), with the output from the register file (REG), or with the output from the operand registers (OP11, OP22).

The arithmetic input selectors (SEL) are controlled by the comparator circuit (COMP) as follows: When the comparator circuit (COMP) detects a coincidence between the contents of the preceding register number retaining parts (OR11, OR21) and the register number of the next instruction, the comparator circuit (COMP) selects the register cache pass (RCPS) as the input to the arithmetic input selectors (SEL). This implements a register cache arrangement that allows the operand of the preceding instruction to be used unmodified by the next instruction without reading data from the register file (REG).

The basic control mechanism of instruction register output selectors (ISEL1,ISEL2) is similar to previous register designator arbitration. The behavior of the instruction register output selector (JSEL1,ISEL2) is described in FIGS. 14 and 15.

When the operand register OP11 gets data arithmetic input register SEL11 by bypassing in prior art bypass processing or register cache scheme of this invention, the instruction register output ISEL1 selects either register part R12 or selects register part R11.

When the operand register OP12 gets data from arithmetic input register SEL21 by bypassing in prior art bypass processing or register cache scheme or this invention, the instruction register output ISEL2 selects either register part R22 or selects register part R21.

In terms of coincidence detection timing, there are illustratively three hardware configurations in which to establish the comparator circuit (COMP):

First Hardware Configuration

Figure 5:
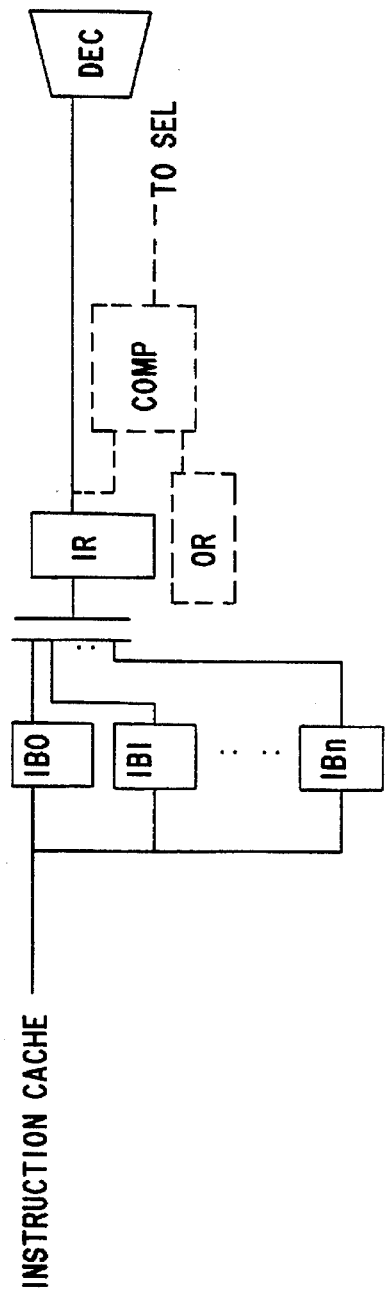
FIGS. 5, 6, 7, and 8 are views showing how the comparator circuit is arranged in the apparatus for use with the invention.
Figure 6:
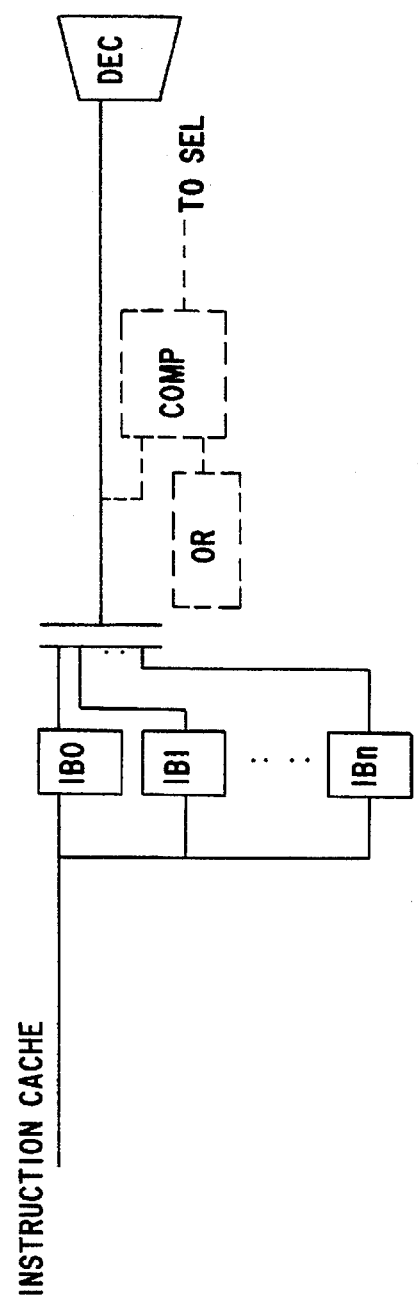

A first hardware configuration, depicted in FIGS. 5 and 6, involves using signals to be decoded as they are for coincidence detection during pipeline processing. This configuration has variations shown in FIGS. 5 and 6.

FIG. 5 depicts a simplified version of the hardware setup shown in FIG. 4. In FIG. 5, the comparator circuit (COMP) is located on the output side of the instruction register (IR). When an instruction is read from the instruction register (IR), the comparator circuit (COMP) compares the register designation field of that instruction with the contents of the preceding register number retaining part (OR) acting as a register cache for coincidence therebetween.

There exist some information processing apparatuses of this hardware configuration wherein instructions are read direct from an instruction buffer (IB) without the use of an instruction register (IR). In such cases, as illustrated in FIG. 6, the comparator circuit (COMP) may be located on the output side of the instruction buffer (IB). In this setup, when an instruction is read from the instruction buffer (IB), the comparator circuit (COMP) compares the register designation field of that instruction with the contents of the preceding register number retaining part (OR) acting as a register cache for coincidence therebetween.

Second Hardware Configuration

Figure 7:
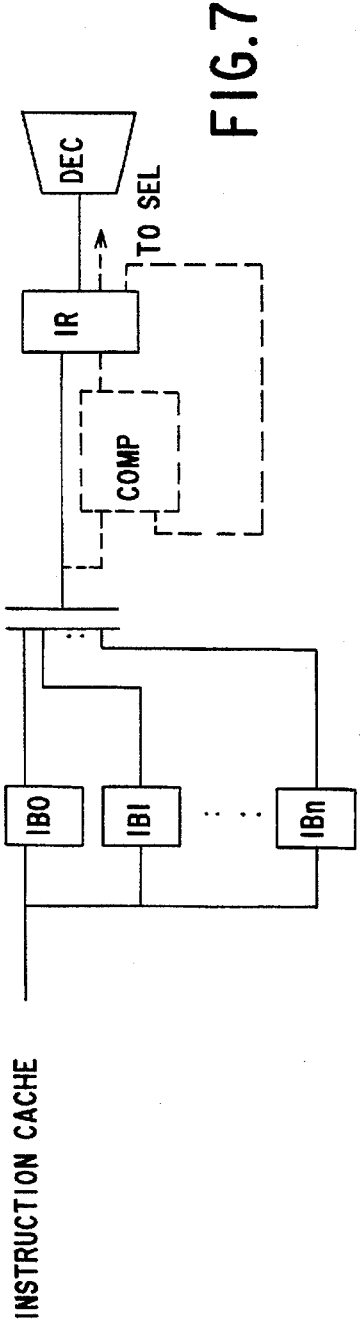
Figures 13, 14, 15:
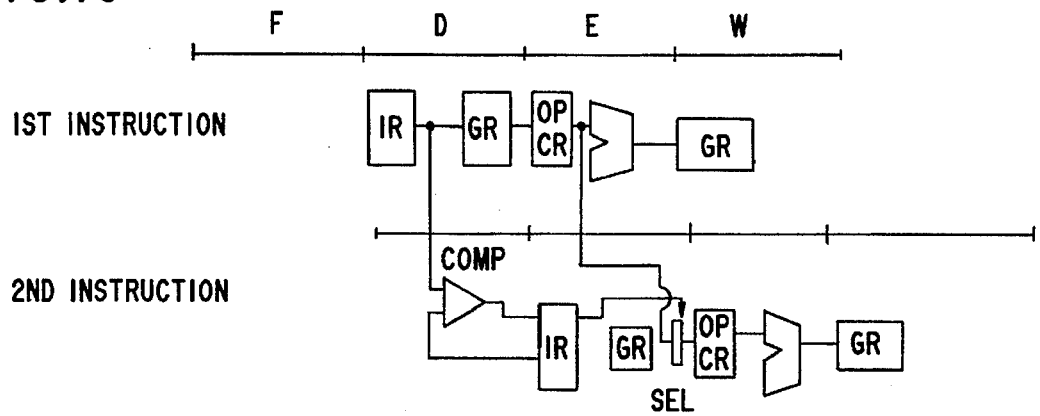
FIG. 13 is a view showing how pipeline processing occurs in a typical hardware configuration for use with the invention.
FIGS. 14–15 are tables depicting the conditions under which the instruction register output selector means of the apparatus operates in connection with the invention.

A second hardware configuration, shown in FIG. 7, involves detecting the coincidence between the current and next register numbers before the decode stage is reached. In this configuration, the comparator circuit (COMP) is located on the input side of the instruction register (IR). In synchronism with the transfer of an instruction from the instruction buffer (IB) to the instruction register (IR), the comparator circuit (COMP) compares for coincidence the register designation field of the current instruction in the instruction register (IR) (i.e., the register number of the instruction executed in the cycle immediately preceding that of the instruction currently placed in the instruction register (IR)) with the register designation field of the next instruction which is selected from instruction buffer (IB). FIG. 13 is a conceptual view of how this configuration allows pipeline processing to take place.

The instruction executed in the cycle immediately preceding that of the instruction currently placed in the instruction register (IR) is the instruction placed in the instruction register (IR) in the decode stage at the present time (for preceding instruction). The next instruction has its register designation field (to be placed in the instruction register (IR) in the next decode stage) compared with the register designation field of the instruction held in the instruction register (IR) for the preceding instruction.

This hardware configuration permits detection of coincidence between the current and preceding register numbers before the decode stage is reached. Thus the processing is carried out at relatively high speed.

Third Hardware Configuration

Figure 8:
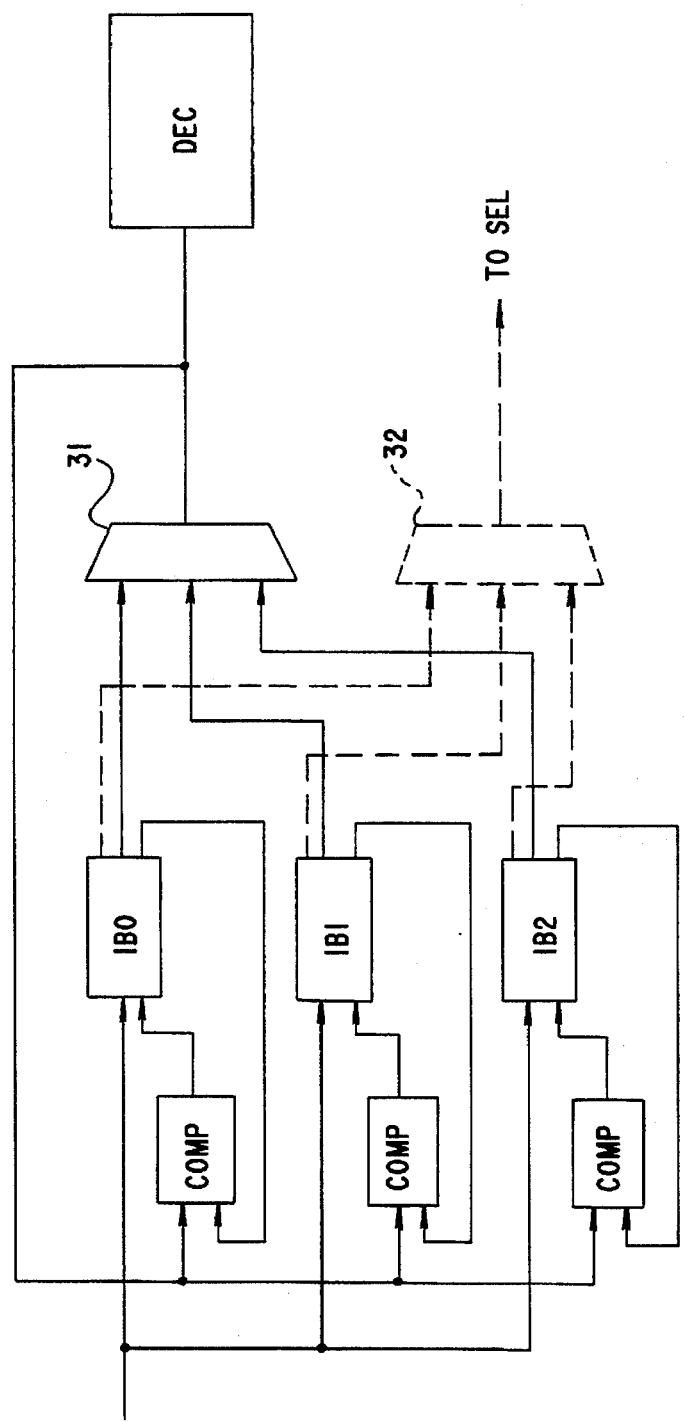

A third hardware configuration, as shown in FIG. 8, involves comparing the register number of the currently decoded instruction with that of the instruction in each of instruction buffers (IB: IB0–IB2) for coincidence. Because no instruction register (IR) is provided, this hardware configuration permits processing at very high speed.

The comparator circuit (COMP) is installed upstream of the instruction buffer (IB). One input to the comparator circuit (COMP) is the register number retained in the instruction buffer (IB). The other input to the comparator (COMP) is the register number of the currently decoded instruction. If the comparator circuit (COMP) detects a coincidence between the register number of the current decoded instruction and that held in the instruction buffer (IB), the comparator circuit (COMP) issues a coincidence detection signal. This signal is placed temporarily in the instruction buffer (IB) before being sent through the route indicated by broken line to the arithmetic input selector (SEL) for direct activation thereof. In FIG. 8, reference numerals 31 and 32 are selectors.

In the pipeline processing based on the third hardware configuration, the coincidence between register numbers is detected before the decode stage and at the timing of the instruction buffer (IB) that is not used at that point in time. This setup implements a register cache arrangement that causes no delays in the subsequent decoding process.

The three hardware configurations also includes a control system, not shown, for performing prior art bypass processing. The system comprises a circuit, not shown, for checking to see if the result of the arithmetic circuit (ALU) is stored in the register to be referenced by the next instruction. If the result is found in the register, the circuit issues a coincidence signal. The signal causes the arithmetic input selector (SEL) to select as its input an arithmetic circuit output bypass (BPS).

How the arithmetic input selector (SEL) is controlled will now be described with reference to FIG. 4 as well as to FIGS. 9 through 12. The description will be made for three cases: bypass processing, register cache processing, and processing other than these two. FIG. 9 describes the workings of the arithmetic input selector (SEL) installed on the input side of the operand register (OP11).

Described first will be how the arithmetic input selector is controlled in the case of general bypass processing in a pipeline process. If the register number in the first register part (R11) of the instruction register (IR) is coincident the first destination operand (ODR1) of the instruction currently executing in the execute stage, the output of the arithmetic circuit (ALU1), i.e., an arithmetic circuit output bypass (BPS1), is sent selectively to the arithmetic input selector (SEL11). If the first register part (R11) is coincident the second destination operand (ODR2), an arithmetic circuit output bypass (BPS2) on the side of the arithmetic circuit (ALU2) is selected. This is what typically occurs as general bypass processing in the pipeline process. Although there exist circuits for determining the conditions for the above selection, descriptions of such circuits are not relevant herein and are thus omitted.

Described next will be how the arithmetic input selector is controlled in the case of register cache processing. If the register number in the first register part (R11) of the instruction register (IR) is coincident the register number of the first source operand in the instruction in the execute stage (i.e., register number of OP11 stored in OR11), then the output of the operand register (OP11), i.e., a register cache pass (RCPS1), is sent selectively to the arithmetic input selector (SEL11).

Lastly, how the arithmetic input selector is controlled will be described with respect to a process that is neither bypass processing nor register cache processing. In this case, the arithmetic input selector (SEL11) follows ordinary processing steps (i.e., reading data from the register file). That is, the output (BDP1) of the first port (PT1) is selected from the register file (REG) for the arithmetic input selector (SEL11).

FIG. 10 describes the workings of the arithmetic input selector (SEL12) located on the input side of the operand register (OP12), FIG. 11 depicts the workings of the operand input selector (SEL21), and FIG. 12 outlines the workings of the arithmetic input selector (SEL22). Although FIG. 4 shows that the contents of the operand register (OP11) may be cached by the other four operand registers (OP11, OP12, OP21, OP22) and those of the operand register (OP21) by the operand registers (OP21, OP22), register cache combinations are not limited thereto.

Program 1 below is a typical sequential search program written in the C programming language. This program, used in conjunction with the invention, reduces the number of register ports.

---

(Program 1)

```
search(X)
{
    int i;
    for(i=0; 1<N; I++)
        if (A[I]=X) then return I;
    return −1;
}
```
---

Program 2 below is a program obtained by coding Program 1 above in VLIW pseudo assembler language:

(Program 2)

```
            G3=N
            G2=top address of A
            G1=0
LOOP:
            CMP G1, G3    G4=LOAD(G2+G1)
            BGE EXIT
                          CMP G4, G5
            BNE LOOP      G1=G1+8
                          G1=G1-8
            BR (G31)      G1=G1/8
EXIT:
            BR (G31)      G1= -1
```

Because Program 2 above necessarily involves an idle time due primarily to the wait state for a LOAD instruction, Program 2 is modified into Program 3 below (for loop-unrolling processing). Although the loop processing time is increased only by 1τ, search is now available in units of two elements. It is assumed that constants 8 and 16 for pointer update purposes are assigned beforehand to general registers. In Program 3, each line is prefixed with a line number for explanatory expediency. A pair of numbers placed in the rightmost position of some of the lines in Program 3 have the following meaning: The left-hand side number indicates the number of register ports needed for conventional bypass processing, and the right-hand side number is the number of ports required when the register cache scheme of this invention is utilized in conjunction with conventional bypass processing.

(Program 3)

```
01                  G9=8                G1=0
02 LOOP:
03                  G4=LOAD(G8+G1)      G1=G1+G9       ;2 2
04      CMP G1,G3   G5=LOAD(G8+G1)      CMP G1,G3      ;2 1
05      BGE EXIT                        CMP G4,G6      ;1 1
06      BEQ                             CMP G5,G6      ;1 0
        FOUND
07      BNE LOOP    G1=G1+G9                           ;2 2
08 FOUND:
09                  G1=G1-G9
10      BR (G31)    G1=G1/G9
11 EXIT:
12      BR (G31)    G1= -1
```

In line 03 of Program 3 above, loop feedback from line 07 requires two ports (i.e., G8, G9) for reading data from the register file (REG) because G1 can be bypassed in prior art bypass processing. By contrast, if the register cache scheme of this invention is utilized in combination with the bypass processing, only one port is needed (for reading of G8 alone) because G9 is cached from line 07.

On line 04, G1 is bypassed by the preceding instruction. This line 04 needs two ports for G3 and G8. By contrast, using the register cache scheme of the invention in combination allows G8 to be cached. This leaves only G3 to be read. Thus only one port is needed. On line 06, G6 is cached while G5 is bypassed from LOAD instruction on line 04. Thus no port is needed.

If dummy instructions are added to Program 3, the resulting Program 4 turns out to be more efficient than ever in processing, as shown below.

(Program 4)

```
01              G9=8                G1=002
                                    LOOP:
03              G4=LOAD(G8+G1)      G1=G1+G9       ;2 1
04              G5=LOAD(G8+G1)      CMP G1,G3      ;2 1
05   BGE EXIT                       CMP G4,G6      ;1 1
06   BEQ FOUND   G1=G1              CMP G5,G6      ;2 1
07   BNE LOOP    G1=G1+G9                          ;1 1
```

On line 03, one port is sufficient (G8) for reading data from the register file (REG) as described before.

On line 04, one port is sufficient (G3) for reading data from the register file (REG) because G1 and G8 are subject respectively to the prior art bypass processing and to the register cache processing according to the invention.

On line 05, one port is enough for reading of G6 because the bypass processing from the LOAD instruction is available.

On line 06, G6 and G1 may be read because G5 is bypassed from the LOAD instruction. Since G6 is handled by the register cache in this example, only G1 needs to be read. That is, one port is sufficient. As a result, line 07 also requires only one port for reading of G9.

As indicated, a slight modification of Program 3 into Program 4 (involving the addition of a dummy instruction: G1=G1 on line 06) makes it possible to execute the entire sequential search program using only one port.

Described below is a data transfer program as another example of the inventive method whereby the number of register ports is reduced:

(Program 5)

```
        DO I-1,N
          B(I)=A(I)
        CONTINUE
```

Program 6 below is a exemplary program obtained by describing Program 5 above in pseudo assembler language. Each line of the program is prefixed with a line number of explanatory expediency. A pair of numbers placed in the rightmost position of some of the lines in Program 6 have the same meaning as mentioned above: The left-hand side number indicates the number of register ports needed for conventional bypass processing, and the right-hand side number is the number of ports required when the register cache scheme of this invention is utilized in conjunction with conventional bypass processing.

(Program 6)

```
01              G2=(I-1)*4
02              G5=(N-1)*4
03              G3=top address of A      G4=top address of B-4
04              G2=0
05 LOOP:        G1=LOAD(G3+G2)           G2=G2+4         ;3 1
06                                       CMP G2,G5       ;1 1
07              STORE(G4+G2)=G1          BNE LOOP        ;2 1
```

In the above example, line 05 in the case of conventional bypass processing would require reading G3, G2 and G2 from the register file (REG) for processing. Because no data are written direct to G2 where the loop branches, G2 is almost always not subject to bypass processing. According to the invention, however, a register read operation is carried out for STORE address generation on line 07, allowing the contents of G2 to be cached. Thus the register file (REG) need only be accessed for reading G3 alone.

On line 06, G2 is subject to conventional bypass processing. The register file (REG) is thus accessed for reading G5 only. On line 07, neither G2 nor G4 can be bypassed. However, the invention requires only G4 to be read because G2 used in the processing of line 06 is now cached.

In this manner, combining the register cache scheme of the invention with conventional bypass processing drastically reduces the necessary quantity of hardware for implementing a desired processing setup. Whereas a process based on the conventional bypass scheme typically requires at least three ports so as to avoid the wait state for register read operations, the same process can be addressed with only one port if performed in combination with the register cache scheme of this invention.

When the above process is carried out using the hardware configuration of FIG. 4, one of the two ports (PT1, PT2) becomes completely idle. This idle time may be utilized in performing low-priority reading of data from registers or other asynchronous operations.

An alternative method for controlling the arithmetic input selector (SEL) is to inhibit the selector from selecting the port output (PT) of the register file (REG). This involves a hardware configuration whereby only a reference to the preceding instruction or the bypass processing of updated register data is available. The invention still applies to this hardware configuration. The reason is that in most cases, while two source registers are specifiable to a instruction, one of the two registers need only be designated or the combined use of conventional bypass processing and the register cache scheme of the invention is available. That is, quite frequently, a register number designated does not necessary require actual reading of data from the register file (REG).

Although the above embodiment uses ALU's as its arithmetic circuit arrangement, shift operation circuits or floating-point arithmetic units may be utilized instead.

As many apparently different embodiments of this invention may be made without departing from the spirit and scope thereof, it is to be understood that the invention is not limited to the specific embodiments thereof except as defined in the appended claims.

What is claimed is:

1. An information processing apparatus performing pipeline processing by operation on instructions, which contain a source operand for selecting register data, comprising:

register file means for storing said source operand;

arithmetic circuit means for operation on fetched data;

arithmetic input selector means interposingly provided between said register file means and said arithmetic circuit means;

cache register means for temporarily holding said source operand output for said arithmetic circuit means;

register cache pass means for connecting the output of said cache register means to the input of said arithmetic input selector means; and comparator means for detecting a coincidence between said source operand held in said cache register means and the source operand to be used by a next instruction in said register file means, and for selecting the input signal from said register cache pass means as the output signal from said arithmetic input selector means, wherein said source operand held in said cache register means is output to said arithmetic circuit means via said register cache pass means;

wherein said cache register means holds the source operand output from the register file means via said arithmetic circuit means or holds the source operand output from the cache register means itself via said register cache pass means.

2. An information processing apparatus according to claim 1, wherein said comparator means includes preceding register number retaining means for retaining register designation information used by the preceding instruction; and resister designation selector means which inputs the register designation information to be used by said next instruction and at least one another register designation and output a register designation which is connected said register file means;

wherein said comparator means compares the contents of said preceding register number retaining means with the register designation information to be used by said next instruction for detecting coincidence therebetween, and causes said arithmetic input selector means, in case of said coincidence, to move the register data held in said cache register means via said register cache pass means to said arithmetic circuit means, and causes said register designation selector means, in case of said coincidence, to move said another register designation to said register file means to get another data from said register file.

3. An information processing apparatus according to claim 1, further comprising operand register means used as said cache register means for retaining the operand for said arithmetic circuit means.

4. An information processing apparatus according to claim 1, further comprising, upstream of said register file means, preceding register number retaining means, instruction buffer means and instruction register means, said preceding register number retaining means retaining the register designation number used to read data from said cache register means;

wherein said comparator means, in synchronism with the cycle in which to read an instruction from any one of said instruction buffer means and said instruction register means, detects a coincidence between the contents of said preceding register number retaining means and those of any one of said instruction buffer means and said instruction register means.

5. An information processing apparatus according to claim 1, further comprising instruction buffer means and instruction register means located upstream of said register file means;

wherein said comparator means, in synchronism with the transfer of an instruction from said instruction buffer to said instruction register means, detects a coincidence between the register designation information currently decoded and residing in said instruction register means and the register designation information in said instruction buffer means.

6. An information processing apparatus according to claim 1, further comprising instruction buffer means located upstream of said register file means, said comparator means being located upstream of said instruction buffer means;

wherein said comparator means is supplied as one input thereof with the register designation information from said instruction buffer means and is supplied as the other input thereof with the currently decoded register designation information, said comparator means further issuing a coincidence detection signal in case of a coincidence between the two kinds of register designation information, said coincidence detection signal being temporarily stored in said instruction buffer means before being sent to and causing said arithmetic input selector means, in synchronism with a next stage, to move the register data in said cache register means to said arithmetic circuit means via said register cache pass means.

7. An information processing apparatus performing pipeline processing by operation on instructions, which contain a source operand for selecting register data, comprising:

register file means for storing said source operand;

arithmetic circuit means for operation on fetched data;

arithmetic input selector means interposingly provided between said register file means and said arithmetic circuit means;

cache register means interposing provided between said arithmetic input selector and said arithmetic circuit means, said cache register means for temporarily holding said source operand output by said arithmetic input selector means;

register cache pass means for connecting the output of said cache register means to the input of said arithmetic input selector means; and comparator means for detecting a coincidence between said source operand held in said cache register means and the source operand to be used by a next instruction in said register file means, and for selecting the input signal from said register cache pass means as the output signal from said arithmetic input selector means, wherein said source operand held in said cache register means is output to said arithmetic circuit means via said register cache pass means.

* * * * *